Feb. 19, 1957     L. BODDY     2,782,401
PLURAL CONDITION RESPONSIVE SIGNAL SYSTEM
WITH INITIAL TESTING
Filed Sept. 3, 1953
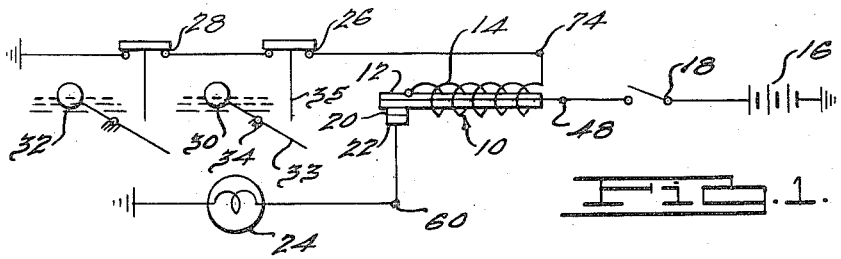
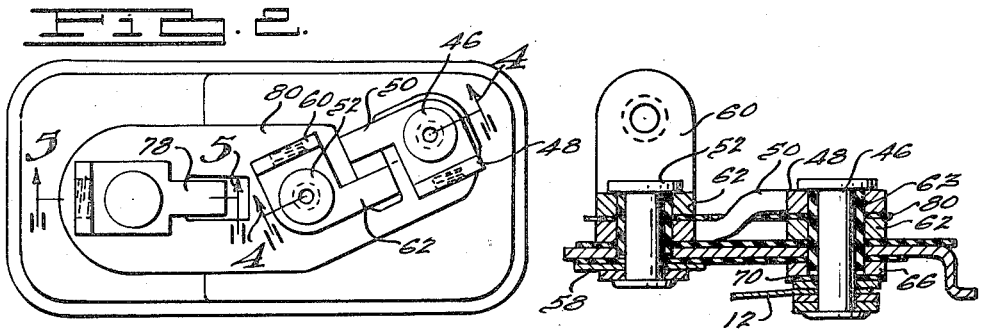
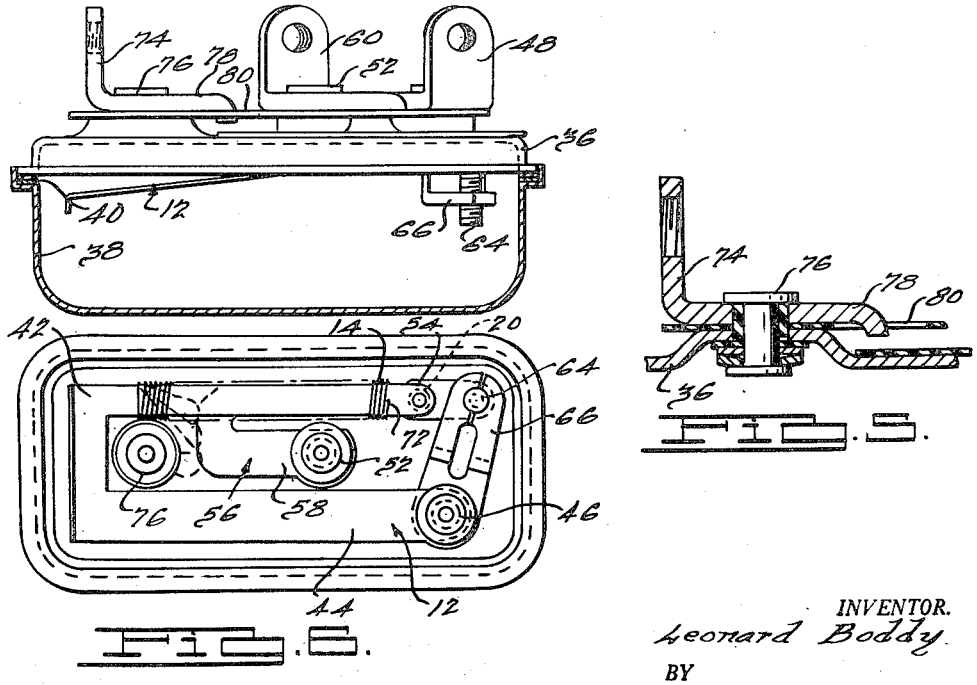
INVENTOR.
Leonard Boddy
BY
Harness, Dickey & Pierce
ATTORNEYS

United States Patent Office 2,782,401
Patented Feb. 19, 1957

2,782,401

PLURAL CONDITION RESPONSIVE SIGNAL SYSTEM WITH INITIAL TESTING

Leonard Boddy, Ann Arbor, Mich., assignor to King-Seeley Corporation, Ann Arbor, Mich., a corporation of Michigan Application September 3, 1953, Serial No. 378,281

3 Claims. (Cl. 340—213)

This invention relates to signal systems and more particularly to an improved signal system for indicating the existence of an abnormal or critical physical condition on a motor vehicle.

Heretofore, various electrical gauging systems have been devised to indicate the physical conditions on a motor vehicle, as for example, the fuel level, oil level, engine temperature, battery charging rate, oil pressure and the like. It has also been found desirable to provide signaling systems, as distinguished from gauging systems, which operate to attract the attention of the vehicle operator whenever a particular physical condition reaches an abnormal or critical value, as for example, low fuel level, low oil pressure, high engine temperature and the like, in order to prevent inconvenience to the operator and damage to the vehicle.

The physical conditions for which it is desirable to provide a signal to indicate a critical value may be divided into two categories: those which are always at a dangerous or critical value when the ignition switch is first turned on to start the engine, such as oil pressure and battery charging rate; and those which are not necessarily at a dangerous or critical value when the ignition switch is first turned on, such as fuel level, oil level and engine temperature.

Prior signaling systems automatically operate when the ignition switch is first turned on to indicate that the physical conditions in the first-mentioned category are at a dangerous or critical value, thereby enabling the operator to ascertain that the signaling system is operating and in proper working order. However, prior signaling systems are subject to the defect that they do not necessarily operate when the ignition switch is first turned on to indicate the physical conditions in the second category with the result that the operator cannot conveniently ascertain whether the signaling system is in proper working order.

Accordingly, an object of the invention is to overcome disadvantages inherent in prior signaling systems of the indicated character and to provide an improved signaling system which operates momentarily when the ignition switch is first turned on in order to show the signaling system is in proper working order.

Another object of the invention is to provide an improved signaling system that is simple in construction, economical to manufacture, efficient and reliable in operation.

Another object of the invention is to provide an improved signaling system which operates in the event an operating condition reaches a critical value.

Still another object of the invention is to provide an improved signaling system which may be added to a vehicle as an accessory or which may be supplied as a part of the original equipment thereof.

The above as well as other objects and advantages of the invention will become apparent from the following description, the appended claims and the accompanying drawings wherein:

Figure 1 is a diagrammatic view of a signaling system embodying the present invention;

Fig. 2 is a top plan view of a preferred form of a control unit constructed in accordance with the present invention;

Fig. 3 is a side elevational view of the structure illustrated in Fig. 2;

Fig. 4 is an enlarged sectional view of a portion of the structure shown in Fig. 2 taken on the line 4—4 thereof;

Fig. 5 is an enlarged sectional view of a portion of the structure shown in Fig. 2, taken on the line 5—5 thereof; and Fig. 6 is a view in bottom plan of the structure shown in Fig. 2.

Referring to the drawings, a signaling system incorporating the present invention is illustrated in Fig. 1 and includes a thermally responsive control unit, generally designated 10, having a bimetallic element 12 which carries a heater winding 14. The bimetallic element 12 is electrically connected to a source of potential 16 through a control switch 18 which may, for example, be controlled concurrently with or be a part of the ignition switch of a motor vehicle. While the present invention is shown as applied to a signaling system of a motor vehicle, it will be understood that the invention is also applicable to other uses.

The bimetallic element 12 carries a movable contact 20 which normally engages a fixed contact 22 and the contact 22 in turn is connected to ground through a signaling lamp 24 which may be disposed on the dashboard or in any other convenient place in the vehicle within the vision of the vehicle operator. It will, of course, be understood that other signaling devices may be used, as for example, a buzzer.

One terminal of the winding 14 is connected to the element 12 while the other terminal of the winding is connected to ground in series with a plurality of normally closed switches 26 and 28. The normally closed switches 26 and 28 are diagrammatically shown as actuated by floats 30 and 32 which may be disposed in the fuel tank, the oil reservoir, or other liquid reservoir. As the liquid level falls, each float arm 33 pivots about a fixed axis 34 so that the free end of the arm 33 moves upwardly toward the end of the vertically extending arm 35 of the companion switch and the switches 26 and 28 open when the operating condition associated therewith reaches a critical value, as for example, when the fuel tank is five per cent full. Any number of normally closed switches may be connected in series with the winding 14, and such switches may be made responsive to any desired operating condition of the vehicle. Moreover, it will also be understood that condition controlled devices which reduce, instead of interrupt, the heating effect of winding 14 may be utilized.

Closure of the ignition switch 18 to start the engine completes a circuit from the source 16 through the element 12, contacts 20 and 22 and lamp 24 to ground. Completion of the circuit causes the lamp to light immediately, thereby indicating that the signaling circuit is in operative condition. Assuming that the operating conditions are not at a critical value when the ignition switch is initially closed and the switches 26 and 28 are in the normally closed position, a parallel circuit will also be completed from the source 16, through the element 12, heater winding 14 and the switches 26 and 28 to ground. Completion of this just traced circuit supplies heat to the element 12 and causes its temperature to rise. Upon being heated, the element 12 warps and separates the contacts 20 and 22, thereby interrupting the circuit through the lamp 24, and extinguishing the lamp. The circuit through the winding 14 will remain energized so long as the ignition switch is closed and the condition controlled switches 26 and 28 remain in the normally closed position.

In the event an operating condition reaches a critical value, such as low fuel level and assuming the float 30 is disposed in the fuel tank, the float 30 will cause the switch 26 to open, thereby interrupting the circuit through the heater winding 14. The reduction in the heating effect of the winding 14 enables the element 12 to cool and restore the contacts 20 and 22 to the normally closed condition. Closure of the contacts 20 and 22 energizes the circuit from the source through the element 12, contacts 20 and 22, and the lamp 24 to ground and causes the lamp to light, thereby indicating to the operator of the vehicle that an operating condition has reached a critical value. The lamp 24 will continue in the lighted condition until the critical operating condition is corrected. It will be understood that a conventional flasher unit (not shown) could be interposed in the lamp circuit to cause the lamp 24 to flash periodically, as a further aid in attracting the attention of the vehicle operator.

The rate at which heat is supplied by the winding 14 to the element 12 controls the period of time during which the lamp 24 is energized when the switch 18 is initially closed and it will be appreciated that the element 14 will also have a thermal lag when the switches 26 and 28 open the circuit through the winding 14. Such thermal lag prevents the occurrence of transient signals during the operation of the vehicle, such as might occur if the switches 26 and 28 opened because of changes in the level of the liquid in the tank due to sudden stops, starts or turns. Momentary opening of the switches would interrupt the circuit through the winding 14 but would not cause the contacts 20 and 22 to close and complete the circuit through the lamp 24 to ground.

Referring to Figs. 2 through 6, in a preferred form, the bimetallic element 12 of the control unit 10 is preferably mounted within a sealed enclosure which includes upper and lower cup-shaped members 36 and 38, respectively, which may be formed of light-weight metal stampings or other suitable material. In order to prevent the entrance of dirt, moisture and other foreign matter, a sealing gasket 40 is preferably interposed between the casing members 36 and 38. The bimetallic element 12 is shown as being of U-shaped form, having one leg 42 which carries the previously identified heater winding 14 and a companion compensating leg 44. The leg 44 is anchored at its free end to a headed rivet 46 which serves to electrically connect the leg 44 to the exposed terminal 48. It will be appreciated that changes in the ambient temperature conditions have like effects upon the two legs 42 and 44 and cause the connecting bridge to rise and fall, without altering the position of the contacts 20 and 22.

For mounting stability, the terminal 48 has a laterally extending, downwardly deflected leg 50 which is held in place by a companion rivet 52. Terminal 48 of Figs. 2 through 6 thus corresponds to the diagrammatically shown terminal 48 of Fig. 1.

As previously mentioned, the free end of the leg 42 carries the movable contact 20. The companion fixed contact 22 is carried on one end of the free leg 54 of a U-shaped spring strip 56. The leg 54 extends parallel to and is immediately above the leg 42, as viewed in Fig. 6. The other leg 58 of the spring strip 56 is anchored to the casing by the previously identified rivet 52 and is electrically connected thereby to the companion terminal 60. Terminal 60 is diagrammatically indicated in Fig. 1 and is provided with an upwardly extending leg for connection to an output lead. As in the case of terminal 48, terminal 60 is provided with a laterally extending, downwardly deflected leg 62 which is anchored in place by the previously identified rivet 46, and insulated therefrom by suitable insulators, such as 63.

The mounting spring strip 56 for the fixed contact 22 is preformed so that it tends to bow downwardly and press against the movable contact 20, thereby preloading the bimetallic element 12. The free end of the leg 54 of spring strip 56 co-operates with an adjustable stop 64 which limits the downward movement thereof and which can be adjusted as an incident of manufacture to determine the amount of preloading of the bimetallic element 12. This adjustment determines the temperature which the element 12 must attain in order to effect a separation of the contacts 20 and 22 and consequently determines the period of the lamp-checking delay. The adjusting screw 64 is threadably carried by a step-shaped mounting member 66 having a suitably threaded aperture therein and the step-shaped member 66 in turn is carried by the rivet 46 but is insulated therefrom as well as from the bimetallic element by suitable insulators, such as 63 and 70. One end of the heater winding 14 is spot-welded or otherwise electrically connected at 72 to the leg 42 and the other end of the heater winding is connected to a terminal 74 which is secured to the casing by a suitably insulated rivet 76. As in the case of the other terminals, the terminal 74 has a laterally extending, downwardly deflected leg 78 which is held in place by a plate 80. Terminal 74 of Figs. 2 through 6, thus corresponds to the diagrammatically shown terminal 74 of Fig. 1.

While a preferred embodiment of the invention has been shown and described, it will be understood that various changes and modifications may be made without departing from the spirit of the invention.

What is claimed is:

1. A signal system for indicating the existence of a plurality of physical conditions on a motor vehicle having a battery and electric switch means that are actuable to start operation of the vehicle, said system including an electric signal control circuit connected to the battery so as to provide substantially full battery voltage, an auxiliary circuit containing a signaling device, said auxiliary circuit being controlled in accordance with the condition of said control circuit, circuit connections for rendering both said control circuit and said auxiliary circuit subject to the direct control of said switch means and for completing said auxiliary circuit to energize said device when said switch means are initially actuated to start operation of the vehicle, a delayed action relay having an actuating member controlled in accordance with the condition of said control circuit for opening said auxiliary circuit after said device has been energized and thus shown to be in operative condition, and condition actuated means responsive to the existence of a plurality of critical physical conditions and controlling the condition of said control circuit.

2. A signal system for indicating the existence of a plurality of physical conditions on a motor vehicle having a battery and electric switch means that are actuable to start operation of the vehicle, said system including an electric signal control circuit connected to the battery so as to provide substantially full battery voltage, an auxiliary circuit containing a signaling device, said auxiliary circuit being controlled in accordance with the condition of said control circuit, circuit connections for rendering both said control circuit and said auxiliary circuit subject to the direct control of said switch means and for completing said auxiliary circuit to energize said device when said switch means are initially actuated to start operation of the vehicle, a thermally responsive time delay relay having an actuating member controlled in accordance with the condition of said control circuit for opening said auxiliary circuit after said device has been energized and thus shown to be in operative condition, and a plurality of condition actuated switches each responsive to the existence of a critical physical condition and each controlling the condition of said control circuit.

3. A signal system for indicating the existence of a plurality of physical conditions on a motor vehicle having an ignition switch for connecting a battery to certain electrical units of the automobile including the ignition system of the engine, comprising a signaling element, a thermally actuable time delay relay including a polymetallic body portion, a heater winding in heat transfer relation to said body portion and a pair of matable contacts which are in engagement when said heater winding is de-energized, one of said contacts being movable by said body portion, a plurality of control means responsive to said physical conditions, a control circuit connected to the battery so as to provide full battery voltage and including said control means, said heater winding, the ignition switch and said body portion, and a signaling circuit including said contacts, the battery, the ignition switch, said signaling element and said body portion.

References Cited in the file of this patent

UNITED STATES PATENTS

| | | |
|---|---|---|
| 2,511,631 | Gordon | June 13, 1950 |
| 2,571,360 | Hallerberg | Oct. 16, 1951 |
| 2,605,339 | Connolly | July 29, 1952 |
| 2,663,860 | MacInnes et al. | Dec. 22, 1953 |
| 2,663,862 | De Anthony | Dec. 22, 1953 |